June 13, 1961 — H. L. McCLEERY ET AL — 2,987,870
REEL-CLAMPING MECHANISM FOR CABLE-STRANDING APPARATUS
Filed July 10, 1959 — 6 Sheets-Sheet 1

INVENTORS
H. L. McCLEERY
L. O. REICHELT
F. WAHL
D. V. WATERS
BY A. C. Schwarz Jr.
ATTORNEY

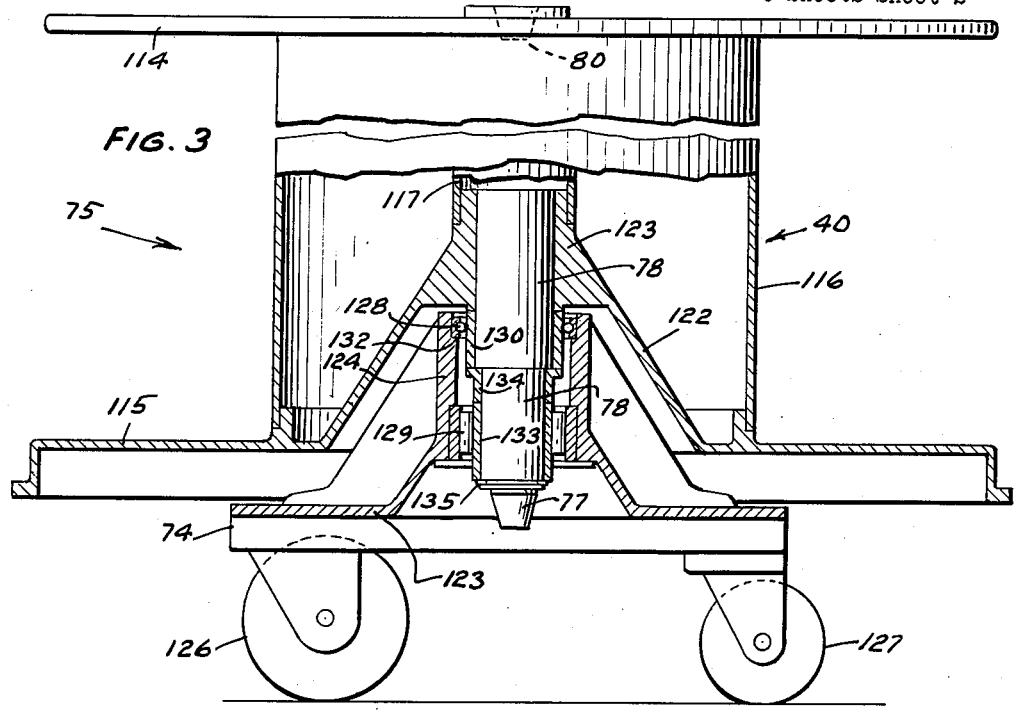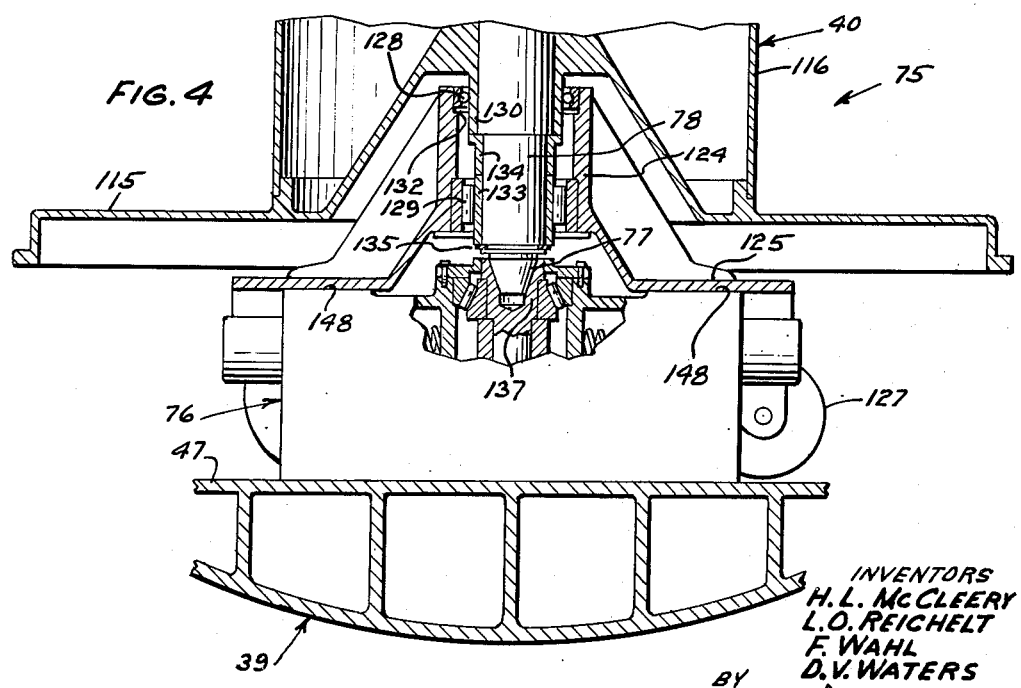

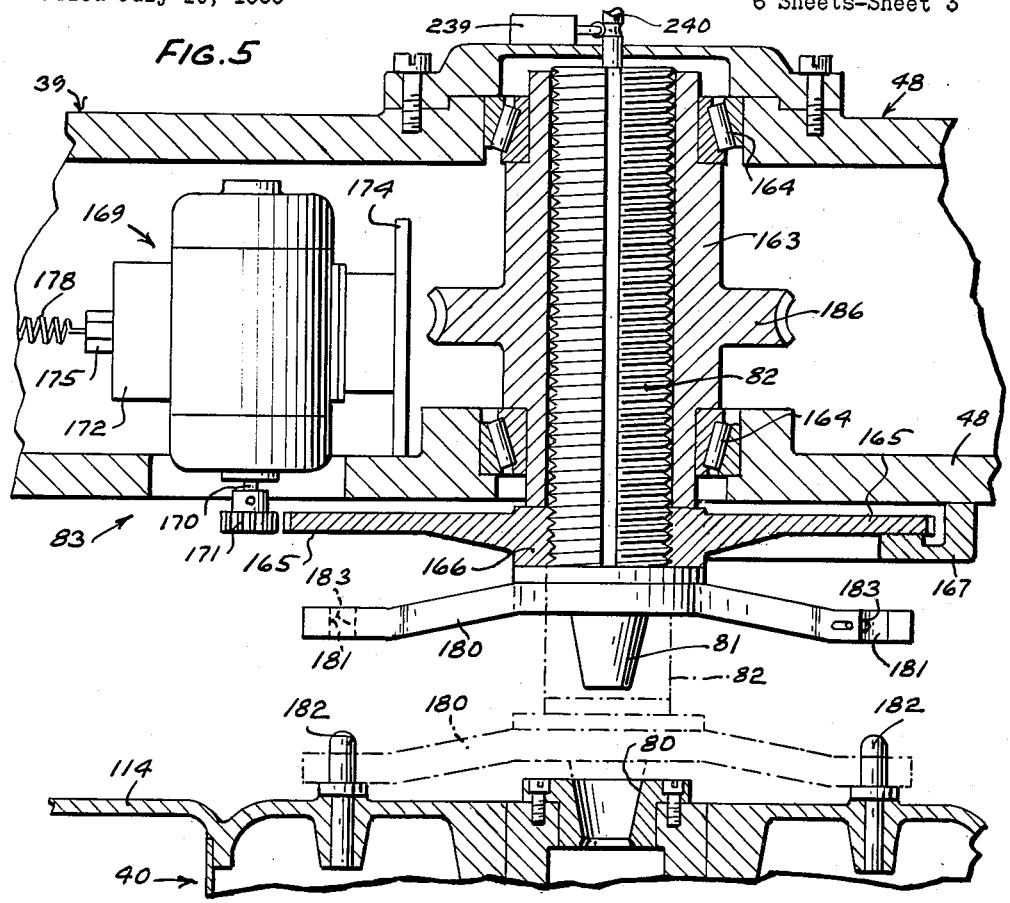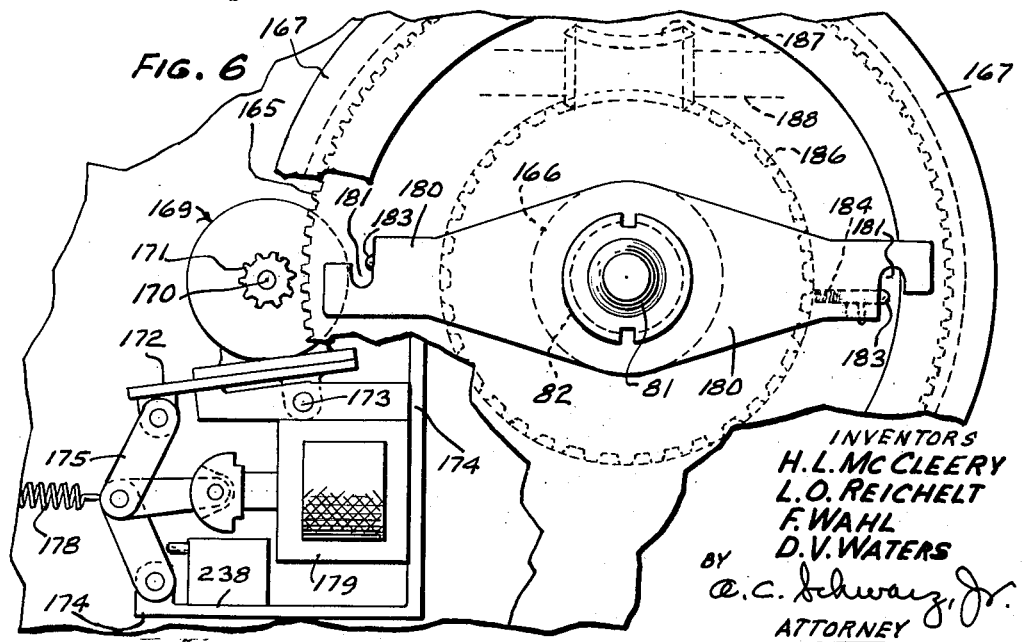

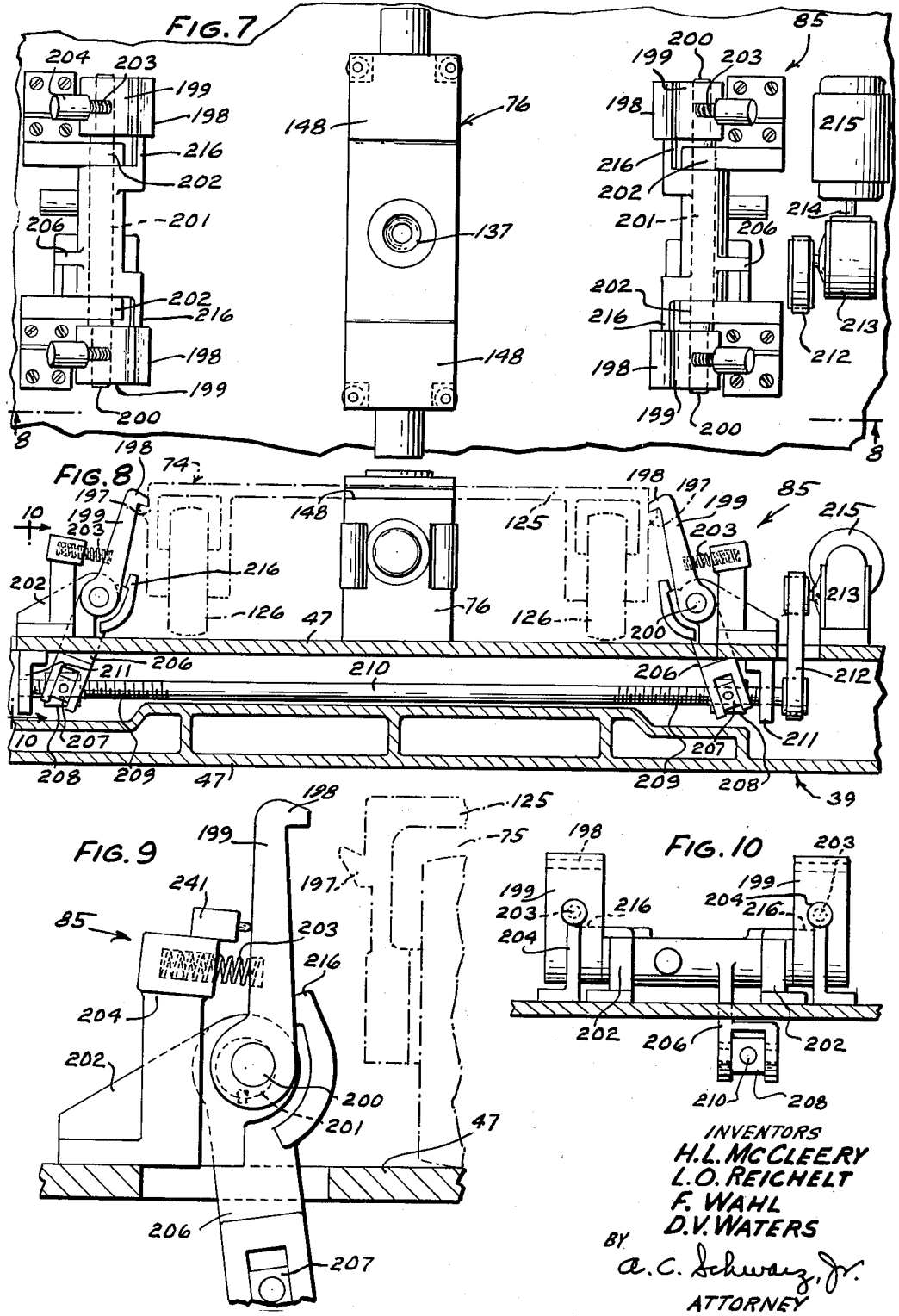

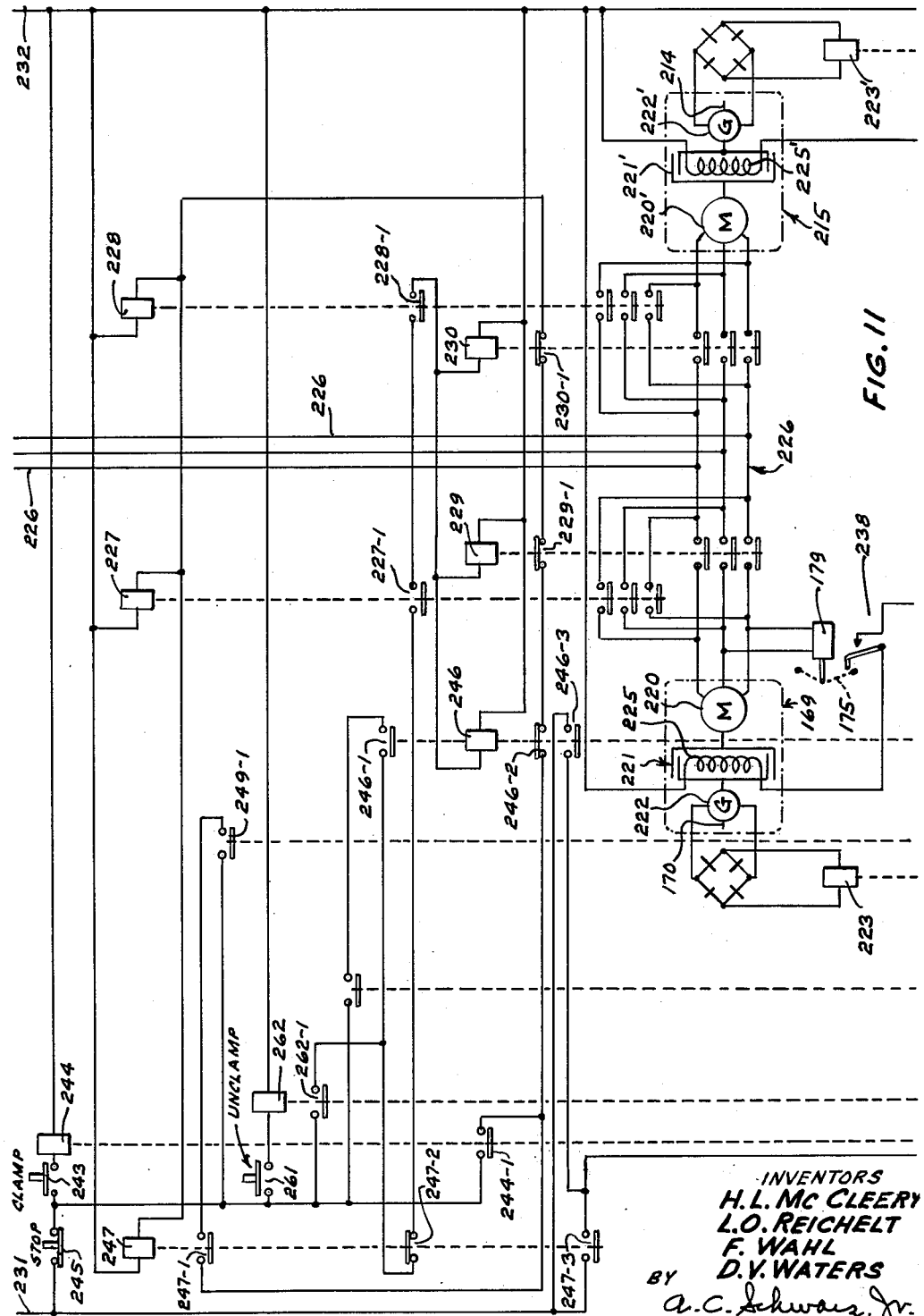

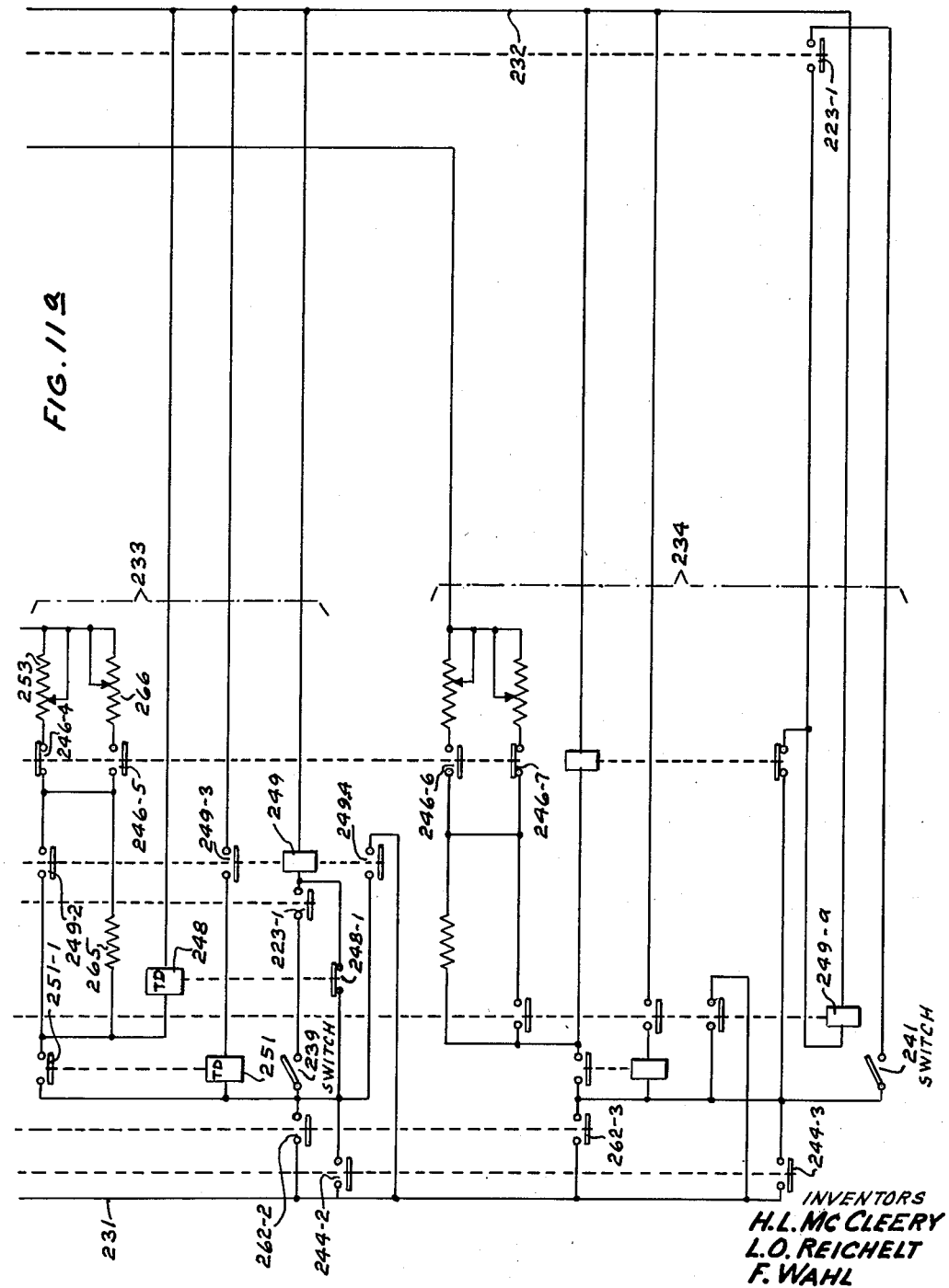

United States Patent Office 2,987,870
Patented June 13, 1961

---

2,987,870
REEL-CLAMPING MECHANISM FOR CABLE-STRANDING APPARATUS
Harold L. McCleery and Lester O. Reichelt, Downers Grove, Ill., and Frank Wahl, North Bergen, and Daniel V. Waters, Lebanon, N.J., assignors, by direct and mesne assignments, to Western Electric Company, Incorporated, New York, N.Y., a corporation of New York
Filed July 10, 1959, Ser. No. 826,224
18 Claims. (Cl. 57—66.5)

This invention relates to a reel-clamping mechanism for cable-stranding apparatus and more particularly to mechanism for releasably securing a cable take-up reel and a supporting truck therefor to a rotatable cradle of the cable-stranding apparatus.

An object of the invention is to provide an improved reel-clamping mechanism for cable-stranding apparatus.

Another object of the invention is to provide mechanism for releasably securing a cable take-up reel and a truck therefor to a rotatable cradle of the cable-stranding apparatus.

A further object of the invention is the provision of reversible clamping mechanism operable in one direction with a predetermined force to clamp a reel and reel-truck unit onto the apparatus and operable in a reverse direction with a greater force to effect the unclamping of the reel and the reel-truck unit.

Another object of the invention is to provide a reversible clamping mechanism operable for effecting the clamping action with a predetermined force and an unclamping action with a second force of greater magnitude than said predetermined force.

A further object of the invention is the provision of a clamping mechanism including a reversible motor drive therefor normally disengaged therefrom and a selectively operable control therefor for effecting the engagement and disengagement of the drive with and from the clamping mechanism and the selective actuation of the clamping mechanism in opposite directions to effect the clamping and unclamping actions.

An apparatus illustrating certain aspects of the invention may include a rotatable cradle provided with a platform for supporting a reel and reel truck which reel and reel truck cooperate to form a reel and reel-truck unit. A plurality of clamping arms of a truck-clamping mechanism mounted on the platform of the cradle are actuated by a first reversible variable drive means to clamp the truck to the cradle. A reel centering and clamping member of a reel-clamping mechanism is mounted on the cradle above the reel for axial movement into engagement with the reel to center and clamp it for rotary movement on the cradle and to rotate the reel, the reel-clamping mechanism being actuated by a second reversible variable drive means normally disengaged therefrom.

In response to manual actuation of a "clamp" switch, the first reversible drive means is driven in one direction with a predetermined torque to cause the clamping arms to clamp the reel truck onto the cradle, and the second reversible drive means is caused to move it into operative position in engagement with the reel-clamping mechanism and to actuate it with a predetermined torque to move the reel centering and clamping member into engagement with the upper end of the reel to center the reel and clamp it onto the cradle, and then the second drive means is caused to move from the reel-clamping mechanism in disengaged relation thereto. A reel-driving device is then actuated to rotate the reel centering and clamping member to impart rotation to the reel.

After the cable has been wound onto the reel and the reel is in condition for removal, an "unclamp" switch is actuated to effect the operation of the first and the second drive means in the reverse directions with greater torque than the clamping torque so that the first drive means effects disengagement of the clamping arms from the reel truck, and the second drive means is first moved into operative position in engagement with the reel-clamping mechanism and then effects its operation to disengage the reel centering and clamping member from the reel and return it to its retracted position, after which the second drive means is disengaged from the reel-clamping mechanism.

Other objects and advantages will become apparent by reference to the following detailed description and the accompanying drawings illustrating a preferred embodiment of the invention in which:

FIG. 3 is an enlarged fragmentary sectional view of the reel and reel-truck unit removed from the apparatus;

FIG. 4 is a fragmentary vertical sectional view of the apparatus taken along the line 4—4 of FIG. 1 and showing the reel and reel-truck unit on the apparatus;

FIG. 5 is a fragmentary vertical sectional view through the apparatus taken along line 5—5 of FIG. 2 and showing the reel-clamping mechanism;

FIG. 6 is a fragmentary bottom plan view of the reel-clamping mechanism shown in FIG. 5;

FIG. 7 is a plan view of a portion of the apparatus showing the mechanism for clamping the reel truck;

FIG. 8 is a fragmentary vertical sectional view through the apparatus taken along line 8—8 of FIG. 7;

FIG. 9 is an enlarged fragmentary view of the reel-truck clamping mechanism in unclamped position;

FIG. 10 is a fragmentary vertical cross-sectional view of the reel-truck clamping mechanism taken on line 10—10 of FIG. 8; and FIGS. 11 and 11a comprise a diagrammatic view of the electrical control mechanism for actuating the reel and reel-truck clamping mechanisms.

Figure 1:
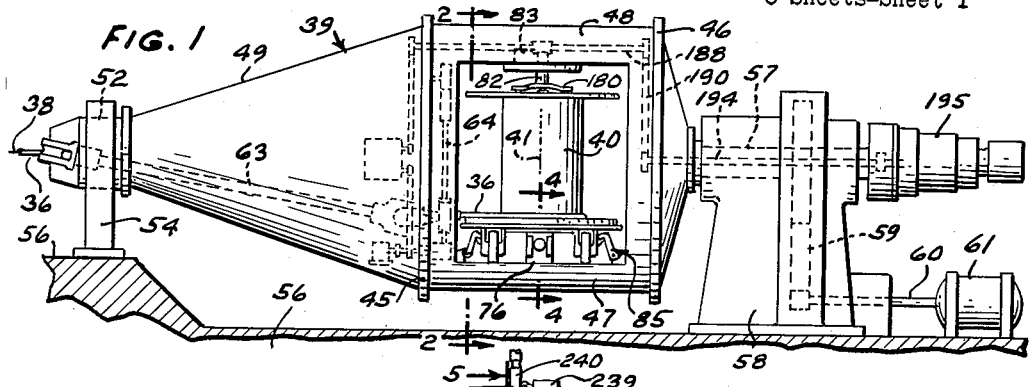
FIG. 1 is a fragmentary side elevational view of the cable-forming apparatus.

In the present apparatus, a cable 36 (FIG. 1) is formed from a plurality of insulated conductors along a substantially horizontal axis 38 and is drawn into a cradle 39 and wound onto a take-up reel 40. This reel is supported on the cradle 39 for rotation about the reel axis 41 and for turning movement with the cradle 39 about the horizontal axis 38 to twist the cable 36.

The cradle 39 is a hollow structural shell having a pair of circular vertically disposed walls 45, 46 and a pair of horizontal parallel frame members 47, 48 extending between the walls 45 and 46 for receiving the reel 40 therebetween, the lower frame member 47 forming a platform on which the reel is supported. A tapering end portion 49 extends from the plate 45 and has a hollow journal 52 secured thereto which is rotatably supported in a pedestal 54 mounted on a base 56. A hollow journal 57 fixed to the frame plate 46 of the cradle is rotatably supported in a pedestal 58 on the base 56 and is connected through a train of gears 59 and a drive shaft 60 to a motor 61 by means of which the cradle 39 and the cable take-up reel 40 are rotated about the horizontal axis 38.

The base 56 has a pit formed therein for receiving a portion of the cradle 39, the upper surface of the base being substantially flush with the upper surface of the platform 47 of the cradle 39 when the cradle is in its loading position to permit the loading of an empty reel 40 onto the cradle and the removal of a full reel therefrom. As the cable moves into the cradle 39, it enters a movable composite guide tube 63 which is swivally connected at one end to the hollow journal 52 and is pivotally connected at its other end to a distributing member of a distributing mechanism 64 for guiding the cable evenly onto reel 40 in successive layers.

The reel 40 is rotatably and permanently mounted on a truck 74 (FIG. 3) which supports the reel 40 when it is removed from the cradle 39 and which cooperates with the reel to form a reel and reel-truck unit 75. When the reel and reel-truck unit 75 is in the cradle 39, the reel 40 and truck 74 are supported on a reel supporting and positioning device 76 which is fixed to the platform 47 of the cradle 39 and is adapted to receive the projecting end 77 of a stub shaft 78 on the lower end of the reel 40.

The upper end of the reel 40 has a tapered socket 80 for receiving the tapered end 81 of a reel centering and clamping shaft 82 which is rotatably mounted on the horizontal frame member 48 of the cradle and is actuated axially into engagement with the reel 40 by a reel-clamping mechanism 83 for clamping the reel against the supporting device 76 and for cooperating with the device 76 to center and support the reel for rotation about its axis 41 and for turning movement with the cradle 39 about the horizontal axis 38. The reel truck 74 is adapted to be securely clamped to the supporting device 76 and the cradle 39 by a reel-truck clamping mechanism 85 for rotation with the cradle.

The reel 40 (FIGS. 2 and 3) has upper and lower heads 114 and 115 which are interconnected by a drum 116 and a tubular member 117, the upper head 114 having the socket 80 for receiving the tapered end 81 of the reel centering and clamping shaft 82, and the lower head 115 having an upwardly directed conical portion 122 and a hub 123 with the stub shaft 78 fixedly secured therein. A portion of the stub shaft 78 extends downwardly through a hub 124 which extends upwardly from a horizontal frame plate 125 of the reel truck 74 on which the reel 40 is rotatably supported when it is removed from the cradle 39. A pair of rollers 126 and a pair of caster rollers 127 are mounted on the reel-truck frame 125 for supporting it for rolling movement.

A ball bearing 128 slidably mounted in the upper portion of the hub 124 on the truck frame 125 and a roller bearing 129 fixedly mounted on the lower end of the hub 124 engage the stub shaft 78 and support the reel 40 for rotation about its axis. The downward thrust of the reel is carried by the roller bearing 128, the inner race 130 of which engages the hub 123 of the lower reel head 115 and the outer race of which is slidably mounted in the hub 124 and rests on a shoulder 132 thereof (FIG. 3). The inner race 130 of the upper bearing 128 and the inner race 133 of the lower bearing 129 are secured to the shaft 78 together with a spacing sleeve 134 by a split locking ring 135 fitting in a groove in the shaft 78.

Figure 2:
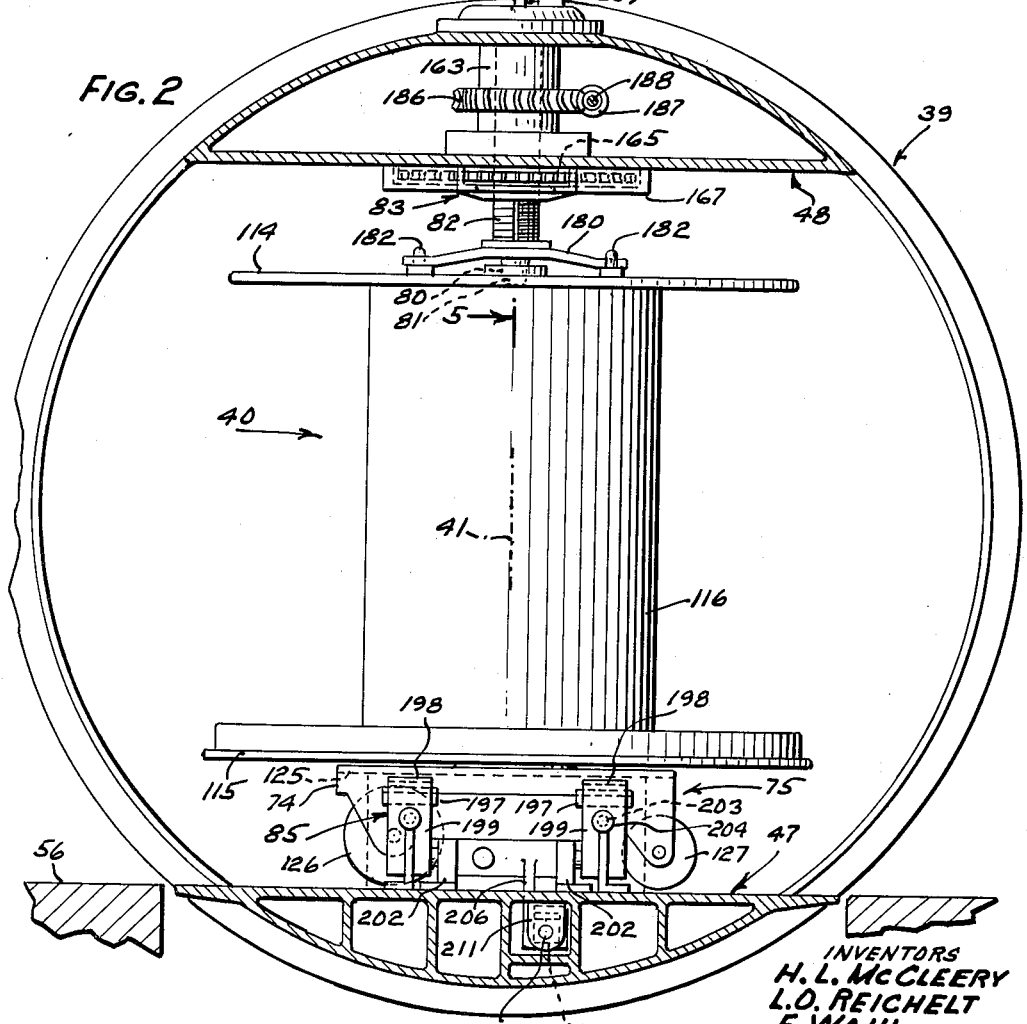
FIG. 2 is an enlarged vertical cross-sectional view through the apparatus taken along the line 2—2 of FIG. 1 showing the reel and reel-truck unit clamped thereto.

This construction is such that the reel 40 and the reel truck 74 are capable of limited axial movement relative to each other which permits the weight of the reel 40 to be supported by the reel truck 74 and the upper thrust bearing 128 when the reel and reel-truck unit 75 is removed from the cradle 39 (FIG. 3) and permits the weight of the reel 40 to be transferred from the reel truck 74 onto a rotatable thrust bearing 137 (FIG. 4) of the positioning device 76 on the cradle 39, and also permits the reel truck 74 to be clamped onto the supporting device 76 and to the cradle 39 when the reel 40 and the reel truck 74 are on the cradle as shown in FIGS. 2 and 4.

When the reel and reel-truck unit 75 is mounted on the cradle 39 (FIG. 4), the reel truck 74 rests on the upper surface 148 of the positioning device 76 and the tapered end 77 of the shaft 78 on the reel 40 seats in a socket of the rotatable thrust bearing 137 which supports the reel 40 in a position in slightly raised relation to the reel truck 74 so that the weight of the reel 40 is removed from the truck 74.

After the reel and reel-truck unit 75 has been transported to the cradle 39 on the fork of a lift truck and lowered onto the positioning device 76 with the lower end of the reel shaft 78 seated in the socket in the thrust bearing 137, the lift truck is withdrawn from the apparatus. The reel-clamping mechanism 83 is then actuated to force the end 81 of the reel centering and clamping shaft 82 into the socket 80 of the upper head 114 of the reel 40 to clamp the reel onto the lower thrust bearing 137 of the supporting and positioning device 76 and in cooperation therewith to support the reel 40 for rotary movement about its axis and for turning movement with the cradle 39 about the horizontal axis 38. Simultaneous with the operation of the reel-clamping mechanism 83, the reel-truck clamping mechanism 85 operates to clamp the truck 74 to the supporting device 76 and the cradle 39.

As shown in FIG. 5, the shaft 82 of the reel-clamping mechanism 83 is splined to a sleeve 163 for rotation therewith and for axial movement relative thereto and this sleeve 163 is supported for rotation and against axial movement in a pair of roller bearings 164 which are supported in the upper horizontal frame member 48 of the cradle. Axial movement is imparted to the reel clamping and driving shaft 82 by a gear 165, the hub 166 of which forms a nut having internal threads engaging external threads on the reel-driving shaft 82. The hub 166 engages the lower end of the sleeve 163 and is held against upward axial movement thereby, and the gear 165 is held against axial movement in the opposite direction by an annular retaining member 167 secured to the horizontal frame member 48.

Rotation is imparted to the gear 165 to effect the axial movement of the shaft 82 into and out of engagement with the reel 40 by a reversible variable motor drive unit 169 having an output shaft 170 with a driving pinion 171 thereon. The motor drive unit 169 is mounted on a plate 172 and is supported for oscillatable movement therewith about a supporting pivot 173 (FIG. 6) to an operative position with the pinion 171 meshing with the gear 165, and to an inoperative position with the pinion disengaged from the gear 165. The supporting pivot 173 is mounted on a bracket 174 suitably secured to the horizontal frame member 48 of the cradle 39.

A toggle linkage 175 connected at one end to the plate 172 and at the other end to the bracket 174 is actuated in one direction by a spring 178 to move the drive unit 169 to its normal inoperative position. A solenoid 179, mounted on the bracket 174 actuates the toggle linkage 175 in the opposite direction to move the motor to its operative position with the pinion 171 in driving engagement with the gear 165.

In addition to serving as an element of the reel-clamping mechanism 83, the shaft 82 has a cross arm 180 fixedly secured thereto for establishing a driving connection with the reel 40. At its ends, the cross arm 180 has arcuate slots 181 for receiving connector pins 182 extending from the head 114 of the reel. With this construction, the cross arm 180 need not be lowered directly onto the connector pins 182 on the reel 40, but the shaft 82 may be lowered into engagement with the reel 40 as indicated in dotted lines in FIG. 5, and when the shaft 82 is subsequently rotated, the ends of the cross arm 180 are moved into engagement with the pins 182 which move past and depress detents 183 and seat in the ends of the slots 181. The detents 183 are slidably mounted in radially disposed recesses in the cross arm 180 and urged outwardly by springs 184 to normal outer positions as shown in FIG. 6 for holding the connector pins 182 in engagement with the cross arm.

Rotation is imparted to the shaft 82 and the reel 40 through the sleeve 163 which has a worm gear 186 thereon (FIGS. 5 and 2) that meshes with a worm 187 on a shaft 188 rotatably mounted in the upper frame member 48 of the cradle 39. The shaft 188 (FIG. 1) is connected through a sprocket and chain connection 190 to a drive shaft 194 which is suitably supported in and extends through the hollow journal 57 and is connected to a motor 195, the housing of which is fixedly secured to the hollow journal 57 for rotation therewith.

Simultaneous with the actuation of the reel-clamping mechanism 83 to clamp the reel 40 firmly on the cradle 39 and establish a driving connection with the reel, the reel-truck clamping mechanism 85 is actuated to clamp the reel truck 75 to the cradle 39 for rotation therewith. Lugs 197 (FIGS. 8 and 9) formed on opposite sides of the reel truck frame 125 are engaged by the hooked ends 198 of four clamping arms 199, a pair of which are pivotally supported on opposite sides of the truck on eccentrics 200 formed on the ends of a pair of shafts 201. These shafts are oscillatably mounted in bearing brackets 202 secured to the horizontal platform 47 of the cradle 39. Springs 203 supported in holders 204 on the platform 47 urge the clamping arms 199 for rotation about the eccentrics 200 into engagement with the reel truck 75 and the clamping lugs 197.

Levers 206 keyed to the shafts 201 are provided for oscillating the shafts and causing the eccentrics 200 to move the clamping arms 199 downwardly to pull the reel truck 75 tightly against the upper surfaces 148 of the supporting device 76. The lower ends of the levers 206 are forked and slotted to receive apertured slide blocks 207 which fit in the forked ends of the levers and oscillatably support nuts 208 which in turn are threadedly mounted on oppositely threaded portions 209 of a shaft 210. This shaft is mounted for rotation and against axial movement in brackets 211 on the platform 47 of the cradle and is driven through a chain and sprocket connection 212 and a gear reducer 213 from the output shaft 214 of a reversible motor drive unit 215 mounted on the platform 47.

Fingers 216 extending laterally from hub portions of the levers 206 are movable into and out of engagement with the clamping arms 199 and serve to disengage the clamping arms from the lugs 197 of the reel truck 75 in response to actuation of the levers 206 to their retracted positions. Thus, in response to rotation of the motor-drive unit 215 in one direction, the shaft 210 is rotated in one direction and the actuating levers 206 are caused to oscillate the shafts 201 and to move the fingers 216 in directions away from the clamping arms 199 thereby allowing the springs 203 to move the hooked ends 198 of the clamping arms 199 into engagement with the lugs 197 on the reel truck 75, and the turning of shafts 201 cause the eccentrics 200 to pull the clamping arms 199 downwardly to clamp the truck 75 tightly onto the supporting device 76 and thus secure the truck 75 to the cradle 39 for rotation therewith. The arrangement of the parts is such that as the levers 206 arrive at their clamping position, the eccentrics 200 pass over dead centers of the shafts 201 and the clamping arms 199 are locked in clamping position thereby (FIG. 8).

The reversible motor drive units 169 and 215 of the reel-clamping mechanism 83 and the reel-truck clamping mechanism 85, respectively, are of the adjustable torque type comprising A.C. squirrel cage motors 220, 220' (FIG. 11) for driving the output shafts 170, 214 through eddy current variable slip-drive couplings 221, 221' and having permanent magnet generators 222, 222' mounted on the output shafts for supplying current which is rectified to energize control relays 223, 223'. Each coupling 221, 221' comprises a pair of concentrically mounted rotating members, one of which is mounted on the motor shaft and the other of which comprises a field section and carries a field excitation coil 225, 225' and is mounted on the output shaft. The motors 220, 220' are connectible to a suitable A.C. power source 226 for rotation in one direction by means of motor-control relays 227 and 228 in a control circuit, and the motors 220, 220' are connectible to the power source 226 for rotation in the opposite direction by means of motor-control relays 229 and 230.

The field excitation coils 225, 225', of the motor-drive units 169 and 215, respectively, are connectible in a control circuit to a suitable power source such as power lines 231, 232 through branch circuits 233, 234, respectively (FIG. 11a), which are adapted to control the strength of the field excitation coils 225 to provide a driving or clamping torque of predetermined value during the clamping of the reel 40 and the reel truck 74 to the cradle 39 and to provide a driving or unclamping torque of greater value than that of said clamping torque to effect the release of the reel-clamping shaft 82 and the clamping arms 199 and their return to their normal retracted positions.

The drive units 169 and 215 and the branch circuits 233 and 234 associated therewith are substantially the same and are actuated simultaneously through the same operations with one exception. The drive unit 215 for effecting the clamping of the reel truck 74 is stationarily mounted on the cradle 39 and is always operatively connected to the reel-truck clamping mechanism 85 whereas the drive unit 169 for effecting the clamping of the reel 40 is movable to and from its normal inoperative position and its pinion 171 disengaged from the gear 165 and an operable position with the gears 171 and 165 meshing.

The branch circuit 233 has a normally open switch 238 (FIG. 11) therein which is actuated to its closed position by the toggle linkage 175 (FIG. 6) when the solenoid 179 is energized and the drive unit 169 has been shifted to its operative position. The branch circuit 233 also includes a control switch 239 mounted on the upper horizontal frame member 48 for actuation by a rod 240 on the reel clamping and centering shaft 82 in response to the operation of the reel-clamping mechanism 83. The switch 239 is actuated to open position to stop the motor drive unit 169 when the reel-clamping shaft 82 reaches its retracted position and is disengaged from the reel 40, and the switch is actuated to its closed position in response to movement of the shaft 82 from its retracted position to condition the branch circuit 233.

The branch circuit 234 also has a control switch 241 (FIG. 9) which is actuated to open position by the clamping arms 199 to stop the motor drive unit 215 when the clamping arms 199 are in their normal retracted position and which switch 241 is actuated to its closed position in response to movement of the clamping arms 199 from their retracted position (FIG. 8).

For purposes of simplifying the description of the operation of the reel-clamping mechanism 83 and the reel-truck clamping mechanism 85, only one drive unit, 169, will be described in detail, it being understood that both drive units 169 and 215 operate substantially in the same manner and are actuated simultaneously.

If we assume that the reel and reel-truck unit 75 has been placed by a lift truck in position on the cradle 39, then in order to clamp the reel 40 and the reel truck 74 onto the cradle, a "clamp" switch button 243 (FIG. 11) is manually closed which effects the energization of a relay 244 and the closing of its contacts 244–1, 244–2, 244–3. In response to the closing of contacts 244–1, a circuit is closed through a normally closed stop button 245, contacts 244–1, contacts 246–2 of a relay 246, contacts 229–1 and 230–1, thruogh motor-control relays 228, 227 and a conditioning relay 247 to effect the energization of relays 227, 228 and 247.

With the energization of the relays 227, 228, the motors 220, 220' and solenoid 179 are connected to the power source 226, thereby causing the motors 220, 220' to rotate in one direction to effect the clamping of the reel 40 and reel truck 75 to the cradle 39, and causing the actuation of solenoid 179 to effect the shifting of the drive unit 169 to its operative position in engagement with the drive gear 165, which in turn effects the closing of the switch 238. The energization of the relay 247 also closes normally open contacts 247–1 and 247–3 and opens normally closed contacts 247–2. The closing of the contacts 247–3, 244–2 and 244–3 connects the branch circuits 233, 234 to the power line 231.

Considering only branch 233, a circuit is completed through contacts 248–1 of a time-delay relay 248 and a relay 249 to power line 232 which effects the energization of relay 249 and the closing of its contacts 249–1, 249–2, 249–3, 249–4. With the closing of contacts 249–1 and contacts 247–1, a circuit is completed from the power line 231, stop button 245, contacts 249–1 and 247–1 to lock in the relays 227, 228, 247 and permit the release of the manually operable "clamp" push button 243 and with the closing of contacts 249–4, the relay 249 is locked in.

With the closing of contacts 249–3, a time-delay relay 251 is energized to close its contacts 251–1 after a predetermined time delay sufficient to insure that the motor 220 associated with branch 233 is rotating. The closing of contacts 251–1 completes a circuit through contacts 249–2, contacts 246–4, a variable resistor 253, the switch 238, the field excitation coil 225 of the drive unit 169, to effect the energization of the coil 225 and thus render the coupling 221 effective to drive the output shaft 170 and the generator 222 thereon. The relay 223 is energized by current from the generator and closes its contacts 223–1. Also, with the closing of contacts 251–1, the time-delay relay 248 is energized and its normally closed contacts 248–1 are opened after a predetermined time delay to transfer the holding circuit for the relay 249 to the contacts 223–1 and the control switch 239 in series therewith.

It will be understood that the motor-drive units 169 and 215 are simultaneously actuated and on completion of the simultaneous clamping actions of the reel-clamping mechanism 83 and of the reel-truck clamping mechanism 85, when the reel-clamping shaft 82 has been driven into clamping engagement with the reel 40 and the clamping arms 199 into clamping engagement with the reel truck 74 with said predetermined clamping torque, the drive couplings 221, 221 of the drive units 169 and 215 will slip and permit the output shafts to stall. This stops the generators 222, 222 and effects the deenergization of relays 223, 223 and the opening of relay contacts 223–1, 223–1 which deenergizes the control relay 249 in branch circuit 233 and a similar relay 249–a in branch 234 and this in turn effects the disconnection of the motors 220 from the power source and stops the drive units 169 and 215.

After a predetermined length of the cable 36 has been wound onto the reel 40, severed from the supply thereof, and the loose end secured to the reel, a normally open "unclamp" switch button 261 is manually closed to effect the energization of relay 262 and the closing of its contacts 262–1, 262–2 and 262–3. With the closing of contacts 262–1, a circuit is completed from power line 231, stop button 245 and contacts 262–1, contacts 247–2, 227–1, 228–1 through motor-control relays 229, 230 and circuit-conditioning relay 246 to effect the energization of the relays 229, 230 and 246 and the connection of the motors 220, 220 and the solenoid 179 to the power source 226, thereby causing the motors 220 to rotate in the reverse direction to effect the unclamping of the reel 40 and the reel truck 74 and causing the energization of solenoid 179 to effect the movement of the drive unit 169 to its operative position in engagement with the drive gear 165, and also to effect the closing of the switch 238. In response to energization of relay 246, its normally open contacts 246–1, 246–3, 246–5, 246–6 are closed and its normally closed contacts 246–2, 246–4, 246–7 are opened. The branch circuits 233 and 234 are connected to the power line 231 through contacts 246–3, 262–2, 262–3 and the components of the branch circuits are sequentially actuated, in a manner similar to that described in connection with the actuation thereof during the clamping of the reel and reel truck, to effect the energization of the excitation coils 221, 221 and the operation of the drive units 169 and 215 in the reverse direction.

The relay 246 conditions the branch circuits 233 and 234 to change the resistance in series with the excitation coils 225 to effect a stronger drive connection between the members of the couplings 221 for driving the output shafts with greater torque during the unclamping operation than during the clamping operation so that the unclamping torque is sufficient to effect the release of the end of the reel-clamping shaft 82 from the socket 80 of the reel 40 and the release of the clamping arms 199 from the reel truck 74. Considering branch circuit 233 for example, current for energizing the excitation coil 225 passes from the power line 231, contacts 246–3, 262–2, 251–1, resistor 265, contacts 246–5, variable resistor 266, switch 238 through the excitation coil 225 to power line 232. The resistors 253 and 266 are variable and may be set to obtain the desired torque from the output shafts of the drive units 169 and 215 during the clamping and the unclamping operations.

On completion of the return movement of the clamping shaft 82 of the reel-clamping mechanism 83 to its normal retracted position, the control switch 239 will be actuated to its open position to stop the drive unit 169 and render it inoperative, and in response to movement of the clamping arms 199 to their normal retracted position, the limit switch 241 will be actuated to its normal open position to stop the reel-truck clamping mechanism 85 and render it inoperative. The reel and reel truck are then in an unclamped condition and are ready to be removed from the cradle 39.

It is to be understood that above-described arrangements are simply illustrative of the application of this invention. Numerous other arrangements may be readily devised by those skilled in the art which will embody the principles of the invention and fall within the spirit and scope thereof.

What is claimed is:

1. In a cable-stranding apparatus, a cable take-up reel, a truck for supporting said reel for rotation thereon, a cradle having a platform for supporting said truck and said reel, a plurality of clamping members, a first reversible actuating means operable in one direction with a predetermined clamping force for effecting the movement of said clamping members into engagement with the truck to clamp said truck to said platform and operable in a reverse direction with a greater force than said clamping force to effect the movement of said clamping members from said truck, a clamping element supported for movement on said cradle above said reel, a second reversible actuating means operable in one direction with a predetermined clamping force for effecting the movement of said clamping element into engagement with the upper end of said reel to clamp said reel against said platform and operable in a reverse direction with a greater force than said clamping force to effect the movement of said clamping element from said reel, and control means for effecting the simultaneous operation of said first and said second actuating means.

2. In a cable-stranding apparatus, a cable take-up reel, a truck for supporting said reel, a cradle having a platform engageable with said truck and the lower end of said reel for supporting said truck thereon against movement and for supporting said reel for rotation about a predetermined axis, a clamping and driving member mounted on said cradle above said reel for rotation about said axis and for axial movement into engagement with the upper end of said reel to establish a driving connection therewith, a first reversible actuating means operable in one direction for moving the clamping and driving member axially into engagement with the upper end of the reel to clamp the reel to said cradle and operable in the reverse direction for moving said clamping and driving member from said reel, a plurality of clamping elements on said cradle for clamping said truck to said cradle, a second reversible actuating means operable in one direction for moving said clamping elements into engagement with said truck and to clamp said truck to said cradle and operable in a reverse direction for retracting said clamping elements to unclamp said truck, selectively operable control means for effecting the simultaneous actuation of said first and said second reversible actuating means, and drive means for rotating the clamping and driving member to impart rotation to said reel.

3. In a cable-forming apparatus, a reel-supporting truck a platform for removably supporting the truck thereon, a plurality of levers, means on the platform for supporting the levers for oscillatable movement about predetermined axes, pivots on said levers disposed in parallel and eccentric relation to said axes, clamping arms oscillatably mounted on said pivots and having hooked ends engageable with the truck, resilient means on said platform for moving the clamping arms about said pivots into engagement with the truck, elements on said levers for moving the clamping arms from the truck in response to movement of said levers in one direction, and drive means on said platform for actuating said levers about said axes to effect sequential movement of said clamping arms toward the truck into engagement therewith and then toward said platform to clamp the truck thereto.

4. In a cable-forming apparatus, a truck for supporting a reel, a cradle for removably supporting the truck, a plurality of levers, means for supporting the levers on said truck for oscillatable movement about predetermined axes, pivots on said levers in parallel and eccentric relation to said axes, clamping arms oscillatably mounted on said pivots and engageable with the truck, resilient means on the cradle for urging the clamping arms about said pivots toward and into engagement with said truck, elements on said levers for moving said clamping arms from said truck in response to movement of said levers in one direction, reversible and variable drive means for actuating said levers, and selectively operable control means for causing the variable drive means to rotate in one direction with a predetermined force to effect the actuation of said levers and said clamping arms to clamp said truck to the cradle and for causing the variable drive means to rotate in a reverse direction with a force greater than said predetermined force to effect the actuation of said levers and said clamping arms to unclamp said truck.

5. In a cable-forming apparatus, a truck for supporting a reel, a cradle for removably supporting the truck, a plurality of levers supported on said cradle for oscillatable movement about predetermined axes and having pivot pins in parallel and eccentric relation to said axes, clamping arms oscillatably mounted on the pivot pins and engageable with the truck, elements movable with said levers for actuating said clamping arms from said truck in response to movement of said levers in one direction, resilient means on the cradle for urging the clamping arms about said pivot pins against said elements and into engagement with said truck in response to movement of said levers in the opposite direction, variable drive means for actuating said levers, selectively operable control means for causing said drive means to rotate in one direction with a predetermined clamping force to effect the actuation of said levers and said clamping arms to clamp the truck to the cradle and for causing the variable drive means to rotate in a reverse direction with a force greater than said predetermined force to effect the actuation of said levers and said clamping arms from said clamping position, and means operable in response to the application by said clamping arms of said predetermined clamping force to the truck for rendering said variable drive means inoperative.

6. In a cable-forming apparatus, a truck for supporting a cable take-up reel, a cradle for removably supporting the truck, a plurality of levers mounted on said cradle for oscillatable movement about predetermined axes and having pivot pins in parallel and eccentric relation to said axes, clamping arms oscillatably mounted on the pivot pins and having hooked ends engageable with the truck, resilient means on the cradle for urging the clamping arms about said pivot pins toward and into engagement with said truck, elements on the levers for moving said clamping arms from said truck in response to movement of said levers in one direction, reversible drive means for actuating said levers, means for controlling said drive means to cause it to rotate in one direction to effect the actuation of said levers and said clamping arms to clamp the truck to the cradle with a predetermined clamping force and to cause said drive means to rotate in a reverse direction to effect the actuation of said levers and said clamping arms from said clamping position with a force greater than said clamping force, means operable in response to the application of said predetermined clamping force to said truck by said clamping arms for rendering said reversible drive means inoperative, and means responsive to the movement of the clamping arms to said retracted position for rendering said drive means inoperative.

7. In a cable- stranding apparatus, a platform for supporting an article, a member mounted on said platform for oscillatable movement about a predetermined axis, a clamping arm pivotally connected to said member in eccentric relation to said axis for oscillatory movement above said pivotal connection to and from the article, resilient means for moving the clamping arm about said pivotal connection toward the article, said member having an element movable therewith for moving the clamping arm away from the article, and means for turning said member about said axis to effect the sequential movement of the clamping arm into engagement with the article and the movement of said arm toward said platform to clamp the article thereto.

8. In a cable-stranding apparatus, a cable take-up reel, means engageable with one end of said reel for supporting said reel for rotation about its axis, a clamping member mounted on said supporting means for movement from a normal retracted position to a clamping position in engagement with the other end of said reel, reversible actuating means on said supporting means operable in one direction with a predetermined clamping force for moving said clamping member to said clamping position to clamp said reel onto said supporting means and operable in the reverse direction with a force greater than said clamping force for disengaging said clamping member from the reel and moving it to said retracted position, and control means for effecting the operation of said actuating means.

9. In a cable-forming apparatus, a cable take-up reel, means engageable with one end of the reel for supporting said reel for rotation about its axis, a clamping member mounted on said supporting means for movement from a normal retracted position to a clamping position in engagement with the other end of the reel to clamp the reel to said supporting means, reversible actuating means on said supporting means for moving the clamping member to and from said clamping position, control means for selectively operating said actuating means, means operable in response to the movement of said clamping member into clamping engagement with the reel for rendering said actuating means inoperative, and means operable in response to the movement of the clamping member to its retracted position for rendering the actuating means inoperative.

10. In a cable-forming apparatus, a cable take-up reel, a cradle having means engageable with the lower end of said reel for supporting said reel for rotation about a predetermined axis, clamping means mounted on said cradle above said reel and having a clamping member movable along said axis from a normal retracted position to a clamping position in engagement with the other end of said reel, variable drive means operable in one direction for actuating said clamping means to move said clamping member to said clamping position with a predetermined clamping force to clamp said reel onto said cradle and operable in the reverse direction with a force greater than said clamping force for disengaging said clamping member from said reel and moving said clamping member to said retracted position, means for shifting said variable drive means to and from a first position disengaged from the clamping means and a second position in engagement with said clamping means, and means for selectively controlling said shifting means and said variable drive means to effect the actuation of said clamping means to clamp and unclamp said reel.

11. In a cable-stranding apparatus, a cable take-up reel, a cradle engageable with one end of said reel for supporting it for rotation about a predetermined axis, clamping means including a clamping member mounted on said cradle for movement from a normal retracted position to a clamping position in engagement with the other end of said reel to clamp the reel to said cradle, a reversible motor drive for actuating said clamping means, means for shifting said motor drive to and from a normal first position disengaged from said clamping means and a second position in engagement with said clamping means, selectively operable circuit means for actuating said shifting means and said motor drive to effect the clamping and the unclamping of said reel, means associated with said circuit means operable in response to the movement of said clamping member into clamping engagement with said reel for rendering said motor drive inoperative and for effecting the shifting of said motor-drive means to said first position, and means associated with said circuit means operable in response to the movement of said clamping member to its retracted position for rendering said motor drive inoperative and for effecting the shifting of said motor drive to said first position.

12. In a cable-forming apparatus, a cable take-up reel, a cradle having means engageable with the lower end of said reel for supporting said reel for rotation about a predetermined axis, clamping means mounted on said cradle above said reel and having a clamping member movable along said axis from a normal retracted position disengaged from said reel to a clamping position in engagement with the other end of the reel for supporting said other end of the reel and establishing a driving connection therewith, reversible drive means for actuating said clamping means, means for establishing and disestablishing a driving connection between said drive means and said clamping means, control means for selectively actuating said last-named means and said drive means to effect the clamping and unclamping of said reel, and means for rotating the clamping member to impart rotation to said reel.

13. In a cable-stranding apparatus, a cable take-up reel, a cradle engageable with one end of said reel for supporting the reel for rotation about a predetermined axis, clamping means mounted on said cradle above said reel and having a clamping member movable along said axis from a normal retracted position disengaged from said reel to a clamping position in engagement with the other end of said reel to clamp the reel to said cradle, reversible drive means operable in one direction for actuating said clamping means to move the clamping member with a predetermined clamping force to clamp said reel onto said cradle and operable in a reverse direction with a force greater than said predetermined force for moving said clamping member to said retracted position, means for connecting and disconnecting said drive means to and from said clamping means, control means for selectively actuating said last-named means and said drive means to effect the clamping and unclamping of said reels, means associated with said control means operable in response to the application of said clamping force by said clamping member to said reel for rendering said drive means inoperative and for disconnecting said drive means from said clamping means, means on said clamping member for establishing a driving connection with said reel in response to movement of said clamping member into engagement with said reel, and means for rotating said clamping member to rotate said reel.

14. In a cable-forming apparatus, a cable take-up reel, a cradle engageable with the lower end of said reel for supporting said reel for rotation about a predetermined axis, a sleeve mounted on said cradle above said reel for rotation about said axis and against axial movement, an externally threaded clamping member mounted in said sleeve for rotation therewith and for axial movement relative thereto from a normally retracted position to a clamping position in engagement with the upper end of said reel for clamping said reel to the cradle, a gear having a threaded aperture rotatably mounted on said clamping member for moving it axially, means on said cradle for supporting said gear against axial movement, reversible drive means mounted on said cradle for movement to and from a first position disengaged from said gear and a second position in engagement therewith, and selectively operable means for effecting the shifting of said reversible drive means to and from said first and second positions and the rotation of said gear in either direction to cause the clamping and the unclamping of said reel.

15. In a cable-forming apparatus, a cable take-up reel, means engageable with one end of said reel for supporting said reel for rotation about its axis, a clamping member mounted on said supporting means for movement along a predetermined axis coaxial with the reel on said supporting means from a normal retracted position to a clamping position in engagement with the other end of said reel, a connector pin extending in an axial direction from said end of said reel in a predetermined radially spaced relation to said axis of said reel, an arm on said clamping member having a slot for receiving said connector pin therein in response to rotation of said arm, means on said arm for releasably holding said pin in said slot in said arm, means for moving said clamping member into engagement with said reel, and means for rotating said clamping member to effect the rotation of said reel.

16. In a cable-forming apparatus, a cable take-up reel, means engageable with one end of said reel for supporting said reel for rotation about its axis, a rotatable clamping member mounted on said supporting means for movement along said axis to a clamping position in engagement with the other end of said reel, a pair of connector pins extending from said end of the reel, a cross arm on said clamping member having slots for receiving said connector pins therein in response to rotation of said cross arm, yieldable means on said cross arm for releasably holding said pins in the slots in said cross arm, means for moving said clamping member into engagement with said reel, and means for rotating said clamping member to effect the rotation of said reel.

17. In a cable stranding apparatus, a cradle, a clamping member movably mounted on the cradle for clamping a component to the cradle, reversible actuating means on said cradle operable in one direction with a predetermined force for moving said clamping member to engage the component and effect the clamping of the component to the cradle and operable in the reverse direction with a force greater than said predetermined force to disengage said clamping member from the component, and selectively operable control means for effecting the operation of said actuating means.

18. In a cable forming apparatus a cable take-up reel, a truck for supporting said reel, a cradle for supporting said truck and said reel, a first member for clamping said truck to said cradle, a second member for clamping said reel to said cradle, reversible actuating means operable in one direction with a predetermined force for effecting the simultaneous actuation of said first and said second clamping members to engage and clamp said truck and said reel to said cradle and operable in the reverse direction with a force greater than said predetermined force to disengage said clamping members from said truck and said reel, and control means for effecting the selective operation of said actuating means.

References Cited in the file of this patent

UNITED STATES PATENTS

| | | |
|---|---|---|
| 1,882,902 | Reichelt | Oct. 18, 1932 |
| 2,339,871 | Merwin | Jan. 25, 1944 |
| 2,733,039 | Balogh | Jan. 31, 1956 |
| 2,822,144 | Jones | Feb. 4, 1958 |
| 2,902,246 | Lapsley | Sept. 1, 1959 |